Oct. 24, 1961  C. O. MUSSER  3,005,270
ORRERY
Filed June 20, 1958  2 Sheets-Sheet 1
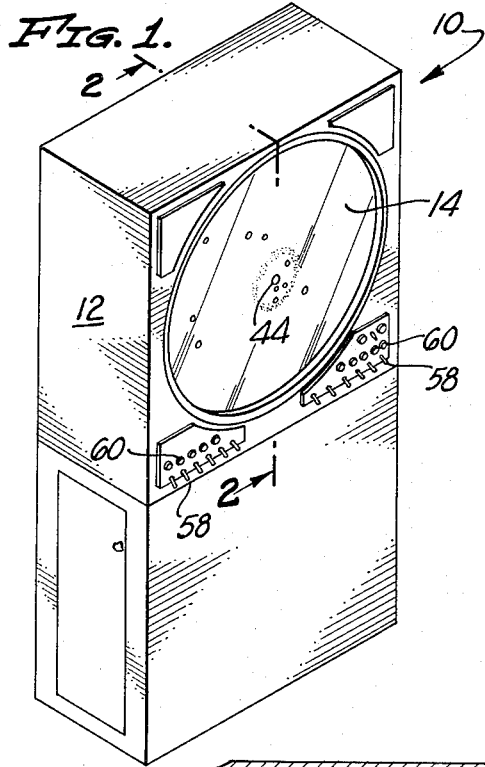
FIG. 1.
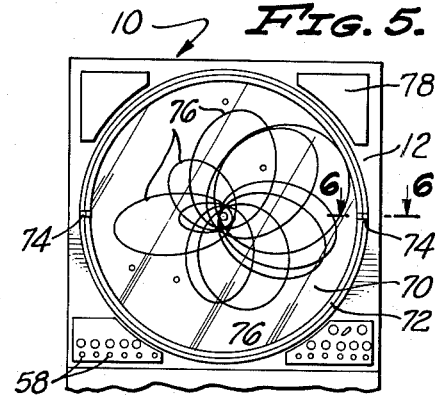
FIG. 5.
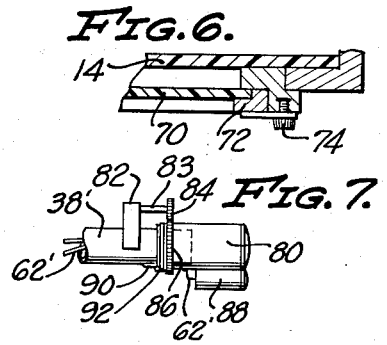
FIG. 6.
FIG. 7.
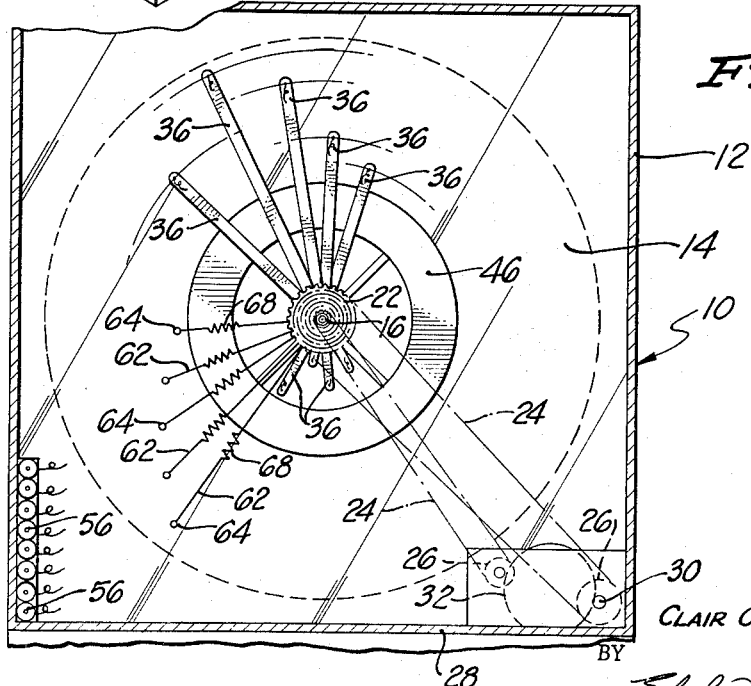
FIG. 3.
INVENTOR.
CLAIR OMAR MUSSER
BY
Attorney Oct. 24, 1961 C. O. MUSSER 3,005,270
ORRERY
Filed June 20, 1958 2 Sheets-Sheet 2
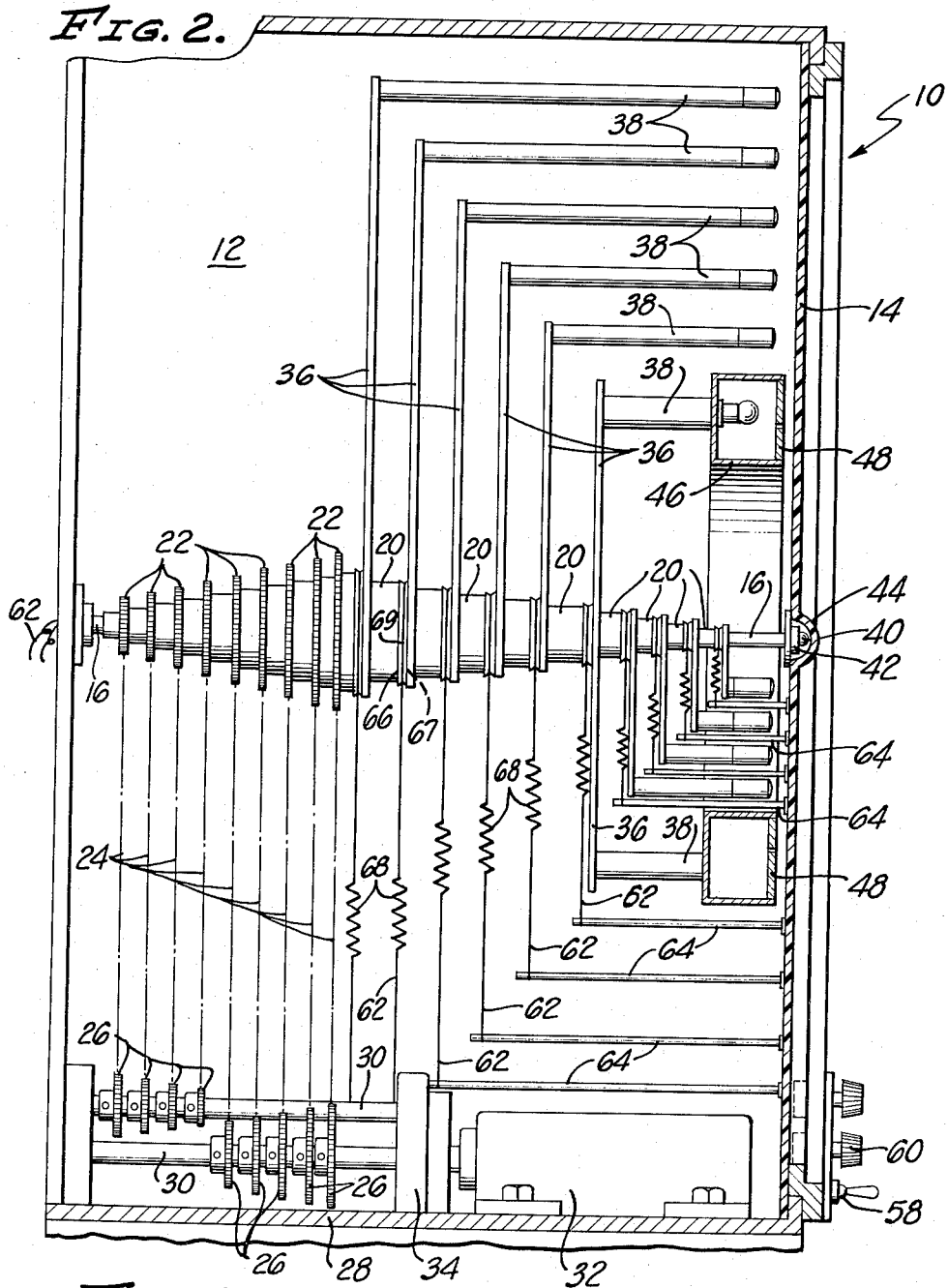
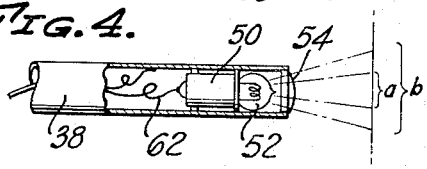
INVENTOR.
CLAIR OMAR MUSSER
BY

United States Patent Office 3,005,270
Patented Oct. 24, 1961

3,005,270
ORRERY
Clair Omar Musser, 12997 Blairwood Drive,
Studio City, Calif.
Filed June 20, 1958, Ser. No. 743,403
16 Claims. (Cl. 35—45)

This invention relates to a new and improved orrery.

The term "orrery" is conventionally used to designate various types of apparatus which illustrate the relative positions and motions of bodies in the solar system. The term "orrery" itself comes from the title of a Charles Boyle, the fourth Earl of Orrery, an astronomer. Conventional orreries normally consist of a stand upon which there are mounted a series of balls corresponding to the earth, the sun and other bodies of the solar system.

A structure of this type is relatively fragile and has a number of important limitations for use as a teaching media. A conventional orrery does not satisfactorily demonstrate the colors and relative intensities of the light from various bodies of the solar system. Further, a conventional orrery cannot satisfactorily demonstrate the nature of the asteroid belt which extends between the planets Mars and Jupiter in our solar system. This asteroid belt is exceedingly important at the present time. Already many individuals contemplating travel into space are discussing the existence of this asteroid belt and the effect it may have upon travel from the planet Earth to the outermost planets of the solar system.

A broad object of the present invention is to provide a new and improved orrery. A more specific object of the invention is to provide an orrery which clearly demonstrates and illustrates the nature of the asteroid belt extending between the planets, Mars and Jupiter. A still further object of this invention is to provide an orrery in which the relative colors, positions and dimensions of the individual planets and the asteroid belt and the sun may be easily indicated and in which the apparent dimensions of the planets may be changed as desired for teaching purposes.

Another object of the present invention is to provide a new and improved orrery which can satisfactorily be employed so as to clearly designate the paths of various comets with respect to the paths of various other bodies within the solar system, itself. This latter object of the invention is quite important for teaching purposes. If a student is to understand the solar system, he must not only understand the relationship of the principal bodies in it and their paths around the sun, but he must also understand the motions of various comets with respect to these other bodies and the sun.

Because of the nature of this invention, it is not considered necessary to set forth in this specification a further list of the advantages and objects of it. Such other objects and advantages of the invention will be more fully apparent from a detailed consideration of the remainder of this description including the appended claims and the accompanying drawing in which:

FIG. 1 is a perspective view of an orrery of this invention;

FIG. 2 is a cross-sectional view taken at line 2—2 of FIG. 1;

FIG. 3 is a rear elevation view of this orrery;

FIG. 4 is an enlarged detail view, partially in section, showing the nature of the light sources which are employed with the orrery of this invention as herewith described;

FIG. 5 is a front plan view of an orrery of this invention used with an overlay indicating the paths of various comets;

FIG. 6 is a cross-sectional view taken at line 6—6 of FIG. 5; and

FIG. 7 is a view similar to FIG. 4 of a modified light source which may be employed with the orrery shown.

It is to be understood that the accompanying drawing is intended to designate a presently preferred embodiment of the invention. Those skilled in the art to which the invention pertains will realize, however, that orreries accomplishing the same objectives as the orrery illustrated can be constructed substituting various equivalents for certain of the parts of the particular orrery shown.

As an aid to understanding the invention it may be stated in essentially summary form that it concerns orreries, each of which includes a housing having a translucent screen located at the front thereof. With these orreries a light source simulating the sun is mounted at the center of the translucent screen so as to be readily visible. Further, a plurality of light sources simulating the various planets are mounted within the housing so as to be capable of being rotated around the sun. Also, a light source simulating an asteroid belt is rotatably mounted in its normal position in the solar system around the sun so that it is capable of being rotated about the sun. Means are provided to rotate the light sources simulating the planets and the asteroid belt at speeds which are proportional to the normal rotational speeds of these bodies in the solar system. Further, with the invention means illustrating the paths of various comets may be positioned upon the translucent screen so that the paths of such comets are visible with respect to the paths of the light sources designating the planets, the asteroid belt and the sun.

Because of the nature of this invention, it is best more fully explained by referring directly to the accompanying drawing. Here there is shown a complete orrery 10 of the present invention which includes a housing 12 having a translucent screen 14 located in the front thereof. The screen 14 may be conveniently formed out of various types of known glass, plastic or the like.

A hollow central shaft 16 extends as shown in FIG. 2 of the drawing from the center of the screen 14 to the back 18 of the housing 12 so as to be mounted upon both this screen and the housing and so as to extend at right angles to the screen. A plurality of tubular shafts 20 are rotatably mounted on the central shaft 16 within the housing 12 so as to be concentric with one another and with the central shaft 16. These tubular shafts 20 have, as shown, different lengths so as to fit over one another in such a manner that their ends are exposed and spaced from one another. Upon the ends of the shafts 20 adjacent to the back 18 of the housing 12 a sprocket 22 is attached to each of these shafts 20. The sprockets 22 are in turn connected by means of drive chains 24 to other sprockets 26. These other sprockets 26 are mounted on the bottom 28 of the housing 12 upon rotatable shafts 30 which are adapted to be driven by a motor 32 through a speed reduced mechanism 34.

The ends of the shafts 20 adjacent to the screen 14 each carry what may be considered to be an "arm means" consisting of an elongated radial arm 36 upon the end of which there rigidly is mounted a tube 38 which extends through the housing to immediately adjacent to the side of the screen 14 within this housing. It is noted that the arms 36 and the tubes 38 carried by the respective shafts 20 are of varying dimensions as shown in FIGS. 2 and 3 of the drawing so as not to interfere with one another as the shafts 20 are rotated.

Within orrery 10 a light bulb 40 simulating the sun is mounted within a socket 42 held by the central shaft 16 so as to extend into a centrally formed colored protuberance 44 in the screen 14.

As will be apparent from FIG. 2 of the drawings tubular shaft 20 which is fourth from the central shaft 16 in the orrery 10 has a plurality of arms 36 extending therefrom instead of a single arm 36; a corresponding tube 38 is mounted upon each of these arms 36. The ends of the tubes 38 on this fifth tubular shaft 20 carry a light tight light box 46 having a surface 48 located immediately back of the screen 14. This surface 48 is preferably provided with a plurality of openings, each of which is colored so as to represent an asteroid. Thus, the entire light 46 represents the asteroid belt.

Each one of the tubes 38 carries a socket 50 in the end thereof adjacent to the screen 14 as indicated in FIG. 4. Further within each of these sockets 50 there is disposed a light bulb 52. All of the tubes 38 except those tubes terminating in the light box 46 also carry a small lens 54 (FIG. 4) facing the screen 14 so as to direct light from the corresponding bulbs 52 toward the side of the screen within the housing 12. If desired, the lenses 54 may be colored, or the individual bulbs 52 may be colored, so as to represent the relative colors of the bodies of the solar system.

The orrery 10 also includes a plurality of individual batteries 56 which are designed so as to supply current to the light bulbs 40 and 52 through independent circuits. Each of these circuits includes a switch 58 mounted on the housing 12 adjacent to the screen 14. Each of these circuits also includes a variable resistor 60 which is designed so as to regulate the amount of current in each of these circuits and includes conventional wires 62. As indicated in FIGS. 2 and 3 of the drawing rods 64 extend from the screen 14 parallel to the tubes 38 so as to be positioned therebetween. These rods 64 support wires 62 so that they extend from the ends of the rods 64 toward slip rings 66 mounted on non-conductive rings 67 on each of the tubular shafts 20. Spring-like sections 68 on the wires 62 cause loops 69 on them to resiliently bear against the slip rings 66 so as to establish electrical contact therewith. The individual slip rings 66 are connected by means of other wires 62 to the individual light bulbs 52 supported by the tubes 38. A ground connection to the batteries 56 is established from all of the bulbs shown through the tubes 38, the arms 36, the shafts 16 and 20, and the metal framework within the housing 12 in a known manner. The light bulb 40 simultating the sun is, of course, directly connected to a switch 58 and a variable resistor 60 by means of wires 62 extending through the central shaft 16.

The use of the orrery 10 is comparatively simple. In using this device the motor 32 is started. As this motor rotates the tubular shafts 20 are caused to rotate by the drive means explained at various rates corresponding to the rates at which planets of the solar system and the asteroid belt rotate about the sun. As this occurs, of course, the light box 46 and the individual light bulbs 52 are rotated immediately in back of the screen 14. By the actuation of appropriate switches 58 these bulbs 52 may be caused to light up so as to be visible through the screen 14.

The intensity of the light transmitted to the screen 14 through the lenses 54 may be at any time regulated through the use of an appropriate variable resistor 60 in the circuit to these light bulbs. Normally the light bulbs 52 in back of the lenses 54 will only give off sufficient light so as to illuminate a small area *a* of the screen 14 as shown in FIG. 4 of the drawing. However, the variable resistors 60 are so proportioned that when properly adjusted sufficient current is supplied to these bulbs 52 so that the light given off will be increased and so that the lens 54 will distribute the light from them over an enlarged area *b* as indicated in FIG. 4, the enlarged area in each case corresponding to a proportional size of a particular planet simulated by a particular bulb 52 so as to represent the relationship of this planet to the remainder of the solar system. The relative brilliance of the asteroid belt represented by the light box 46 may, of course, be similarly controlled by the adjustment of the appropriate resistor 60.

When the orrery 10 is used in this manner it is possible to view the relative motions of any or all of the parts of our solar system through the screen 14 and to study the motions of the various individual planets or of the asteroid belt independently of the motion of various other parts of the solar system through the simple expedient of actuating certain of the switches 58 in the appropriate manner. Similarly, it is possible to study our solar system so that the various planets and the asteroid belt are viewed in their true color and in their true relative dimensions by appropriate adjustment of the variable resistors 60.

Frequently it is desired to clearly indicate the paths of one or more comets with respect to the paths of various bodies within our solar system. For this purpose a transparent overlay screen 70 may be provided as indicated in FIGS. 5 and 6 of the drawing. This screen 70 is carried by a frame 72 which is adapted to be attached to the housing 12 by means of locking screws 74 as indicated in FIG. 6 of the drawing.

The screen 70 preferably is provided with various printed or otherwise applied indicia 76 representing the paths of well known comets. Similar indicia (not shown) can also be applied to the screen 70 indicating the positions of comets at various times. Although it is possible to form such indicia so that they are visually apparent at all times, it is presently preferred to utilize with the orrery 10 an ultra-violet light source 78 and to form the indicia 76 out of a normally substantially invisible phosphor composition of a known type. When such material is used, it is normally invisible but when the ultra-violet light source is actuated, by known means, the indicia 76 become visible so that the paths of various comets can be studied with respect to the remainder of the solar system.

Frequently it is desired to construct an orrery such as the orrery 10 which shows various moons which rotate around certain of the individual planets. If it is desired to do this it is possible to modify the tube 38 previously described as indicated in FIG. 7 of the drawing. There is shown here a tube 38' corresponding to the tube 38 previously described except as herein indicated. The tube 38' serves to rotatably carry another individual tube 80 in such a manner that this tube 80 is capable of being rotated about the tube 38'. Such rotation is accomplished by means of a small electric motor 82 mounted on the tube 38'. As indicated this motor 82 has a shaft 83 extending therefrom which is provided with a gear 84 engaging another gear 86 attached to the tube 80.

The interior of the tube 80 is preferably formed as indicated in FIG. 4 of the drawing and, hence, will not be further described here. To the outside of the tube 80 there is illustrated another tube 88 which is similarly constructed so that a light bulb (not shown) in it is capable of simulating a moon located around a planet simulated by the tube 80. Power is supplied to the light bulbs with the tubes 80 and 88 through a brush 90 attached to the tube 38' so as to project therefrom; this brush 90 is attached to a wire 62' carried by the tube 38'. The brush 90 engages a small slip ring 92 on the tube 80. This slip ring 92 is in turn connected to these bulbs through other wires 62'. Any required number of tubes, such as the tube 88, may be added so as to simulate the actual number of moons located around any specific planet.

Various modifications and changes may be made in the structure shown and described without changing the inherent character of this invention. For this reason the invention is to be considered as being limited only by the appended claims.

I claim:

1. An orrery which comprises: a housing; a translucent screen located at one side of said housing; said screen extending in a flat plane; a hollow central shaft extending through said housing from adjacent to center of said screen, said shaft extending at a right angle to said screen; a plurality of tubular shafts rotatably mounted on said central shaft so as to be concentric with one another and with said central shaft; means for rotating said tubular shafts at different rates; an arm means attached to each of said tubular shafts so as to rotate therewith, each of said arm means terminating adjacent to said screen; a light bulb serving to simulate the sun attached to said central shaft so as to be visible from the outside of said housing; a light box simulating an asteroid belt mounted on the arm means attached to one of said tubular shafts, said light box extending completely around said central shaft and being located adjacent to said screen; a plurality of light bulbs mounted within said light box so as to illuminate the interior of said light box so that said light box may be viewed through said screen; other light bulbs, each of said other light bulbs being mounted on one of the remainder of said arm means, said other light bulbs being mounted adjacent to said translucent screen so as to be visible through said screen; circuit means for supplying current to each of said other light bulbs, and to said plurality of light bulbs within said light box, said circuit means being mounted on said housing, each of said circuit means including switch means and variable resistance means for varying the amount of current supplied to said light bulbs.

2. An orrery as defined in claim 1 including indicia representing the paths of comets located on said translucent screen.

3. An orrery as defined in claim 2 wherein said indicia are composed of phosphers which are not normally visible and including ultra-violet light means for causing said phosphors to become visible.

4. An orrery as defined in claim 2 including an overlay adapted to be positioned on said translucent screen, and wherein said indicia are located on said overlay.

5. An orrery which comprises: a housing having a flat side; a transparent screen covering said side of said housing; a light source simulating the sun mounted within said housing so as to be visible from adjacent to said side of said housing through said screen; a plurality of light sources simulating planets rotatably mounted within said housing so as to be visible from adjacent to said side of said housing through said screen, each of said light sources simulating a planet being capable of being rotated around said light source simulating the sun; means including light source means simulating an asteroid belt rotatably mounted within said housing so as to be visible from adjacent to said side of said housing through said screen, said means simulating an asteroid belt being capable of being rotated around said light source simulating the sun between individual light sources of said plurality of light sources; and means for rotating said light sources simulating planets and said means simulating an asteroid belt around said light source simulating the sun at speeds corresponding to the relative speeds at which the planets and asteroids within the asteroid belt rotate around the sun and switch means for individually controlling the operation of each of said light sources and of said light source means simulating an asteroid belt.

6. An orrery as defined in claim 5 including a transparent screen overlay located on said flat side of said housing, and wherein said transparent screen overlay carries indicia indicating astronomic information.

7. An orrery as defined in claim 6 wherein said indicia are composed or phosphers which are not normally separately visible and including ultra-violet light source means mounted on said housing for causing said phosphors to become visible.

8. An orrery which comprises: a housing having a flat side; a light source simulating the sun mounted within said housing so as to be visible from adjacent to said side of said housing; a plurality of light sources simulating planets rotatably mounted within said housing so as to be visible from adjacent to said side of said housing, each of said light sources simulating a planet being capable of being rotated around said light source simulating the sun; means including light source means simulating an asteroid belt rotatably mounted within said housing so as to be visible from adjacent to said side of said housing, said means simulating an asteroid belt being capable of being rotated around said light source simulating the sun between individual light sources of said plurality of light sources; and means for rotating said light sources simulating planets and said means simulating an asteroid belt around said light source simulating the sun at speeds corresponding to the relative speeds at which the planets and asteroids within the asteroid belt rotate around the sun; means for varying the intensity of said light source and switch means for individually controlling the operation of each of said light sources and of said light source means simulating an asteroid belt.

9. An orrery as defined in claim 8 including a transparent screen located on said flat side of said housing, and wherein said transparent screen carries indicia indicating astronomic information.

10. An orrery as defined in claim 8 wherein said indicia are composed of phosphors which are not normally separately visible and including ultra-violet light source means mounted on said housing for causing said phosphors to become visible.

11. An orrery which comprises: a housing having a flat side; a central shaft extending through said housing from adjacent to the center of said flat side, said shaft extending at a right angle from said flat side; a plurality of tubular shafts rotatably mounted on said central shaft so as to be concentric with one another and with said central shaft; means for rotating said tubular shafts at different rates; an arm means attached to each of said tubular shafts so as to rotate therewith, each of said arm means terminating adjacent to said flat side; a light bulb serving to simulate the sun attached to said central shaft so as to be visible from adjacent to said flat side of said housing; a light box simulating an asteroid belt mounted on said arm means attached to one of said tubular shafts, said light box extending completely around said central shaft and being located adjacent to said flat side of said housing within said housing; a plurality of light bulbs mounted within said light box so as to illuminate the interior of said light box so that light box may be viewed from adjacent to said flat side of said housing; other light bulbs, each of said other light bulbs being mounted on one of the remainder of said arm means, said other light bulbs being mounted within said housing adjacent to said flat side of said housing so as to be visible from adjacent to said flat side of said housing; circuit means for supplying current to each of said other light bulbs, and to said plurality of said light bulbs within said light box, said circuit means being mounted on said housing, each of said circuit means including switch means and variable resistance means for varying the amount of current supplied to said light bulbs.

12. An orrery as defined in claim 11 including a transparent screen located on said flat side of said housing; and wherein said transparent screen carries indicia indicating astronomic information.

13. An orrery as defined in claim 11 wherein said indicia are composed of phosphors which are not normally separately visible and including ultra violet light source means mounted on said housing for causing said phosphors to become visible.

14. An orrery which comprises: a housing having a flat side; a translucent screen covering said flat side of said housing; a central shaft extending through said housing from adjacent to the center of said screen, said shaft extending at a right angle from said screen; a plurality of tubular members rotatably mounted on said central shaft so as to be concentric with one another and with said central shaft; illumination emitting means capable of simulating the sun carried by said central shaft and located adjacent to said screen within said housing so as to be visible from the exterior of said housing; other illumination emitting means capable of simulating planets of the solar system and an asteroid belt carried by said concentric tubular members adjacent to the side of said screen within said housing so as to be visible from the exterior of said housing; and means for rotating said concentric tubular members at proportionate speeds corresponding to the speeds of rotation of the parts of the solar system simulated by the illumination means held thereby.

15. An orrery which comprises: a housing having a flat side; a translucent screen covering said flat side of said housing; a central shaft extending through said housing from adjacent to the center of said screen, said shaft extending at a right angle from said screen; a plurality of tubular members rotatably mounted on said central shaft so as to be concentric with one another and with said central shaft; illumination emitting means capable of simulating the sun carried by said central shaft and located adjacent to said screen within said housing so as to be visible from the exterior of said housing; other illumination emitting means capable of simulating planets of the solar system and an asteroid belt carried by said concentric tubular members adjacent to the side of said screen within said housing so as to be visible from the exterior of said housing; and means for rotating said concentric tubular members at proportionate speeds corresponding to the speeds of rotation of the parts of the solar system simulated by the illumination means held thereby; and variable resistance means mounted on said housing for controlling the amount of illumination emitted from each of said illumination emitting means.

16. An orrery which comprises: a housing having a flat side; a translucent screen covering said flat side of said housing; a central shaft extending through said housing from adjacent to the center of said screen, said shaft extending at a right angle from said screen; a plurality of tubular members rotatably mounted on said central shaft so as to be concentric with one another and with said central shaft; a plurality of arm means extending from said tubular members; illumination emitting means capable of simulating the sun and carried by said central shaft and located adjacent to said screen within said housing so as to be visible from the exterior of said housing; other illumination emitting means capable of simulating planets of the solar system and an asteroid belt carried by said arm means so as to be capable of being rotated as said tubular members are rotated so as to be visible from the exterior of said housing through said screen; and means for rotating said tubular members so that said other illumination emitting means are rotated at proportionate speeds corresponding to the speeds of rotation of the parts of the solar system simulated by said other illumination emitting means.

References Cited in the file of this patent

UNITED STATES PATENTS

| | | |
|---|---|---|
| 25,476 | Allen | Sept. 20, 1859 |
| 575,735 | Reese | Jan. 26, 1897 |
| 749,508 | Wesson | Jan. 12, 1904 |
| 2,178,352 | Unglaube et al. | Oct. 31, 1939 |
| 2,431,847 | Van Dusen | Dec. 2, 1947 |
| 2,442,297 | Link | May 25, 1948 |
| 2,516,418 | Ramsay | July 25, 1950 |
| 2,522,098 | Coste | Sept. 12, 1950 |
| 2,763,183 | Liversidge | Sept. 18, 1956 |

UNITED STATES PATENT OFFICE
CERTIFICATE OF CORRECTION

Patent No. 3,005,270                               October 24, 1961

Clair Omar Musser

It is hereby certified that error appears in the above numbered patent requiring correction and that the said Letters Patent should read as corrected below.

Column 5, line 39, for "transparent" read -- translucent --.

Signed and sealed this 29th day of May 1962.

(SEAL)
Attest:

ERNEST W. SWIDER                               DAVID L. LADD
Attesting Officer                                   Commissioner of Patents